(12) United States Patent
Koskela et al.

(10) Patent No.: US 11,462,349 B2
(45) Date of Patent: Oct. 4, 2022

(54) RESONANCE DAMPING ELEMENT AND POWER CONVERTER WITH THE SAME

(71) Applicant: Vacon OY, Vaasa (FI)

(72) Inventors: Marko Koskela, Vaasa (FI); Jukka Linna, Vaasa (FI); Vesa Väisänen, Vaasa (FI)

(73) Assignee: VACON OY, Vaasa (FI)

( * ) Notice: Subject to any disclaimer, the term of this patent is extended or adjusted under 35 U.S.C. 154(b) by 432 days.

(21) Appl. No.: 16/500,584

(22) PCT Filed: Apr. 21, 2017

(86) PCT No.: PCT/EP2017/059529
§ 371 (c)(1),
(2) Date: Oct. 3, 2019

(87) PCT Pub. No.: WO2018/192670
PCT Pub. Date: Oct. 25, 2018

(65) Prior Publication Data
US 2020/0126708 A1    Apr. 23, 2020

(51) Int. Cl.
*H01F 17/06* (2006.01)
*H01F 27/245* (2006.01)
(Continued)

(52) U.S. Cl.
CPC ......... *H01F 27/245* (2013.01); *H01F 27/085* (2013.01); *H01F 27/10* (2013.01);
(Continued)

(58) Field of Classification Search
CPC ...... H01F 27/245; H01F 27/085; H01F 27/10; H01F 27/263; H02M 1/14; H02M 7/003
(Continued)

(56) References Cited

U.S. PATENT DOCUMENTS 5,929,733 A * 7/1999 Anzawa ................. H05K 1/165
336/200
6,980,074 B1 * 12/2005 Jitaru ..................... H05K 1/165
336/200
(Continued)

FOREIGN PATENT DOCUMENTS

CN        1134028 A     10/1996
CN     204189549 U  *   3/2015
(Continued)

OTHER PUBLICATIONS

Marian K. Kazimierczuk: "Laminated Cores" In "High-Frequency Magnetic Components", Oct. 25, 2013 (Oct. 25, 2013), Wiley, XP055440589.
(Continued)

*Primary Examiner* — Mang Tin Bik Lian
*Assistant Examiner* — Joselito S. Baisa
(74) *Attorney, Agent, or Firm* — McCormick, Paulding & Huber PLLC (57) ABSTRACT

A resonance damping element for a power converter having a positive busbar and a negative busbar, wherein the resonance damping element comprises a magnetic core formed with two openings through which the positive busbar and the negative busbar of the power converter are to be routed, respectively.

17 Claims, 9 Drawing Sheets

(51) Int. Cl.
*H01F 27/08* (2006.01)
*H01F 27/10* (2006.01)
*H01F 27/26* (2006.01)
*H02M 1/14* (2006.01)
*H02M 7/00* (2006.01)

(52) U.S. Cl.
CPC ............ *H01F 27/263* (2013.01); *H02M 1/14* (2013.01); *H02M 7/003* (2013.01)

(58) Field of Classification Search
USPC ........................................................ 336/175
See application file for complete search history.

(56) References Cited

U.S. PATENT DOCUMENTS

| | | | |
|---|---|---|---|
| 7,542,316 B2* | 6/2009 | Nakahori | H01F 38/00 |
| | | | 363/125 |
| 7,581,977 B1* | 9/2009 | Wu | H01R 13/7036 |
| | | | 439/106 |
| 8,427,267 B1* | 4/2013 | Vinciarelli | H01F 27/022 |
| | | | 336/200 |
| 10,128,770 B2* | 11/2018 | Goto | H02M 3/28 |
| 10,658,939 B2* | 5/2020 | Yanagimoto | H02B 1/46 |
| 2017/0040907 A1* | 2/2017 | Goto | H02M 7/44 |
| 2018/0090257 A1* | 3/2018 | Ishihara | H01F 17/06 |

FOREIGN PATENT DOCUMENTS

| | | | |
|---|---|---|---|
| CN | 204760209 U | * | 11/2015 |
| CN | 206471204 U | * | 9/2017 |
| EP | 0474610 A2 | | 3/1992 |
| EP | 2246864 A1 | | 11/2010 |
| JP | 05282619 A | * | 10/1993 |
| JP | 2003031421 A | * | 1/2003 |
| JP | WO2014147930 A1 | | 9/2014 |

OTHER PUBLICATIONS

International Search Report for Serial No. PCT/EP2017/059529 dated Jan. 30, 2018.

* cited by examiner

RESONANCE DAMPING ELEMENT AND POWER CONVERTER WITH THE SAME

CROSS-REFERENCE TO RELATED APPLICATIONS

This application is a National Stage application of International Patent Application No. PCT/EP2017/059529, filed on Apr. 21, 2017, which is hereby incorporated by reference in its entirety.

TECHNICAL FIELD

The present invention relates to a resonance damping element for a power converter and a power converter with the same.

BACKGROUND

The problem to which this invention is related is resonance currents between converter DC-links, when a rectifier (either passive or active) is coupled with a motor inverter unit. Capacitors, for example, film capacitors or electrolytic capacitors, are generally used as a DC-link energy storage in the power converter DC-link. Although the ESR (Equivalent Series Resistance) values in the film capacitors are typically much lower than in electrolytic capacitors, when using these capacitors as the DC-link energy storage in the power converter DC-link, an underdamped LC circuit is formed between the two converters. This underdamped LC circuit will resonate at a certain frequency, which can be close to the power converter switching frequency. As a result, large AC currents may oscillate between the DC-link capacitors, generating losses and heat. The resonance current may cause unwanted overcurrent trips or burn protective fuses. In the prior art, in order to prevent the protective fuses from being burned by overcurrent, they are generally overdimensioned to handle the AC current ripple in addition to the nominal DC current.

SUMMARY

According to an object of the present invention, there is provided a resonance damping element which may increase AC resistance and reduce the ripple current as a function of high frequency.

According to another object of the present invention, there is provided a power converter integrated with a resonance damping element and a liquid cooling arrangement.

According to an aspect of the present invention, there is provided a resonance damping element for a power converter having a positive busbar and a negative busbar. The resonance damping element comprising a magnetic core formed with two openings through which the positive busbar and the negative busbar of the power converter are to be routed, respectively.

In an exemplary embodiment, the magnetic core is formed of laminated magnetic material sheets with insulated laminations, the insulated lamination is an insulation layer separate from the magnetic material sheet or a coating layer on the magnetic material sheet.

In an exemplary embodiment, the laminated magnetic material sheets are welded together by a weld beam running through the magnetic core in the longitudinal direction of the busbars.

In an exemplary embodiment, the laminated magnetic material sheets comprise laminated magnetic silicon steel sheets.

In an exemplary embodiment, the magnetic core comprises a solid block made of magnetic material.

In an exemplary embodiment, the magnetic material comprises iron, structural steel or other iron based alloy.

In an exemplary embodiment, the magnetic core has inner surfaces that face the busbars and outer surfaces that are opposite to the busbars, and a plurality of ridges and grooves are formed to extend along at least one of the inner surfaces and the outer surfaces of the magnetic core, and the ridges and grooves are arranged alternately in the longitudinal direction of the busbars.

In an exemplary embodiment, in the longitudinal direction of the busbars, each ridge has a dimension that is larger than a skin depth of the magnetic core.

In an exemplary embodiment, the magnetic core comprises: three legs each extending in a first direction; and two beams each extending in a second direction perpendicular to the first direction. Each leg has one end connected to one beam and another end connected to the other beam.

In an exemplary embodiment, the magnetic core is configured to have an air gap in at least one of the legs or the beams.

In an exemplary embodiment, the openings are rectangular, round or oval.

Also disclosed is a power converter, which comprises a metallic enclosure and the resonance damping element described above, and a positive busbar and a negative busbar extending through the two openings of the magnetic core, respectively.

In an exemplary embodiment, the power converter further comprises a cooling means adapted to cool the resonance damping element.

In an exemplary embodiment, the resonance damping element is thermally connected to the metallic enclosure and the cooling means cools the resonance damping element by cooling the metallic enclosure.

In an exemplary embodiment, the cooling means comprises a liquid cooling channel integral with the metallic enclosure through which cooling liquid flows.

In an exemplary embodiment, the magnetic core abuts against an outer surface of the metallic enclosure, and the positive busbar and the negative busbar respectively have a positive output terminal and a negative output terminal provided on a side of the magnetic core that is opposite to the metallic enclosure.

In an exemplary embodiment, the power converter further comprises an insulating cover mounted onto the metallic enclosure to cover the magnetic core and insulate the positive and negative busbars from the metallic enclosure openings through which the busbars extends out.

In an exemplary embodiment, the cooling means comprises either a fan or a heatsink.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a resonance damping element for a power converter having a positive busbar and a negative busbar. The power converter could be AC-DC converter, DC-AC converter or DC-DC converter. The resonance damping element comprises a magnetic core formed with two openings through which the positive busbar and the negative busbar of the power converter are to be routed, respectively.

Figure 1:
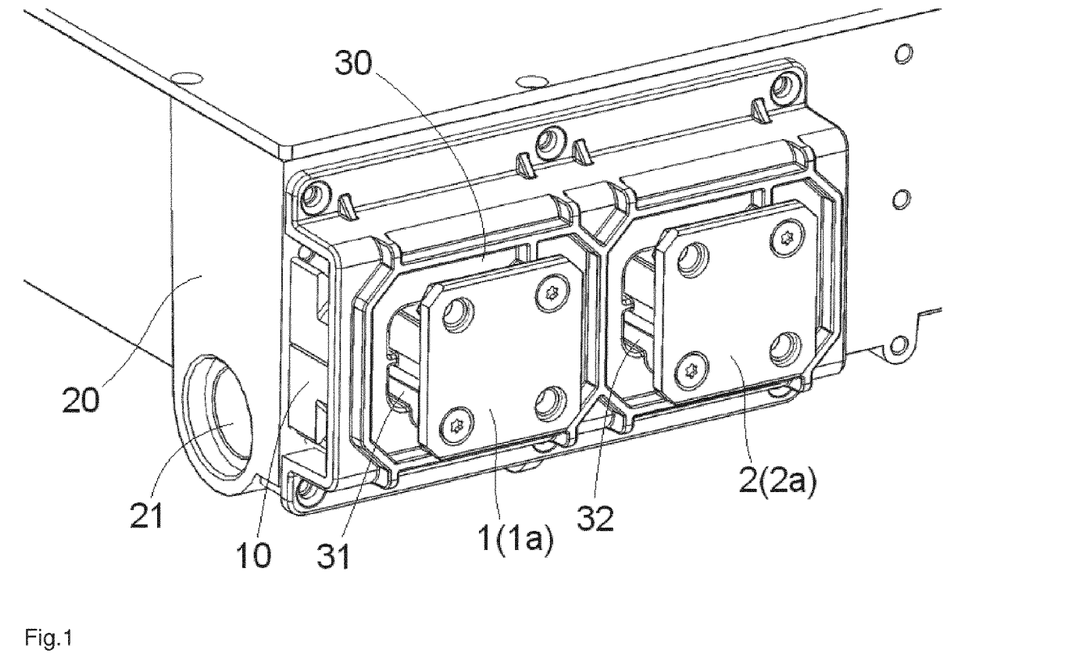
FIG. 1 shows an illustrative perspective view of a power converter integrated with a resonance damping element according to an embodiment of the present invention.

The proposed power converter provided with the resonance damping element is illustrated in FIG. 1. The design philosophy is not to design an actual inductor, but rather a resistive damping element for high frequency resonances.

As shown in FIG. 1, the power converter mainly comprises a metallic enclosure 20; a resonance damping element 10 (will be described in detail later) mounted on the metallic enclosure 20; a positive busbar 1 and a negative busbar 2 extending out of the metallic enclosure 20 and routed through two openings 11, 12 of the resonance damping element 10, respectively.

In the embodiment shown in FIG. 1, the resonance damping element is thermally mounted on the outer wall of the metallic enclosure 20. But the present invention is not limited to this embodiment, for example, in another embodiment, the resonance damping element may be mounted on the inner wall of the metallic enclosure 20. In another embodiment, the resonance damping element may be installed inside or outside of the metallic enclosure 20, and a cooling means, for example, a fan or a heatsink, may be provided to cool the resonance damping element. In another embodiment, the resonance damping element may be installed to a separate heat conductor connected to a liquid cooling channel.

Figure 2:
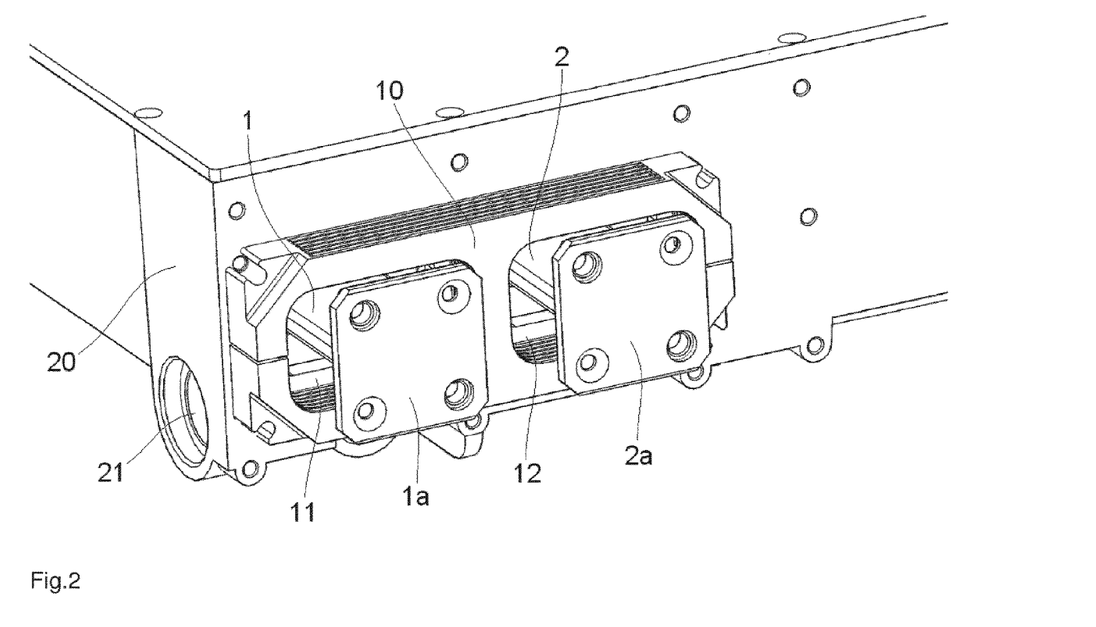
FIG. 2 shows the resonance damping element mounted on the metallic enclosure of the power converter.
Figure 4:
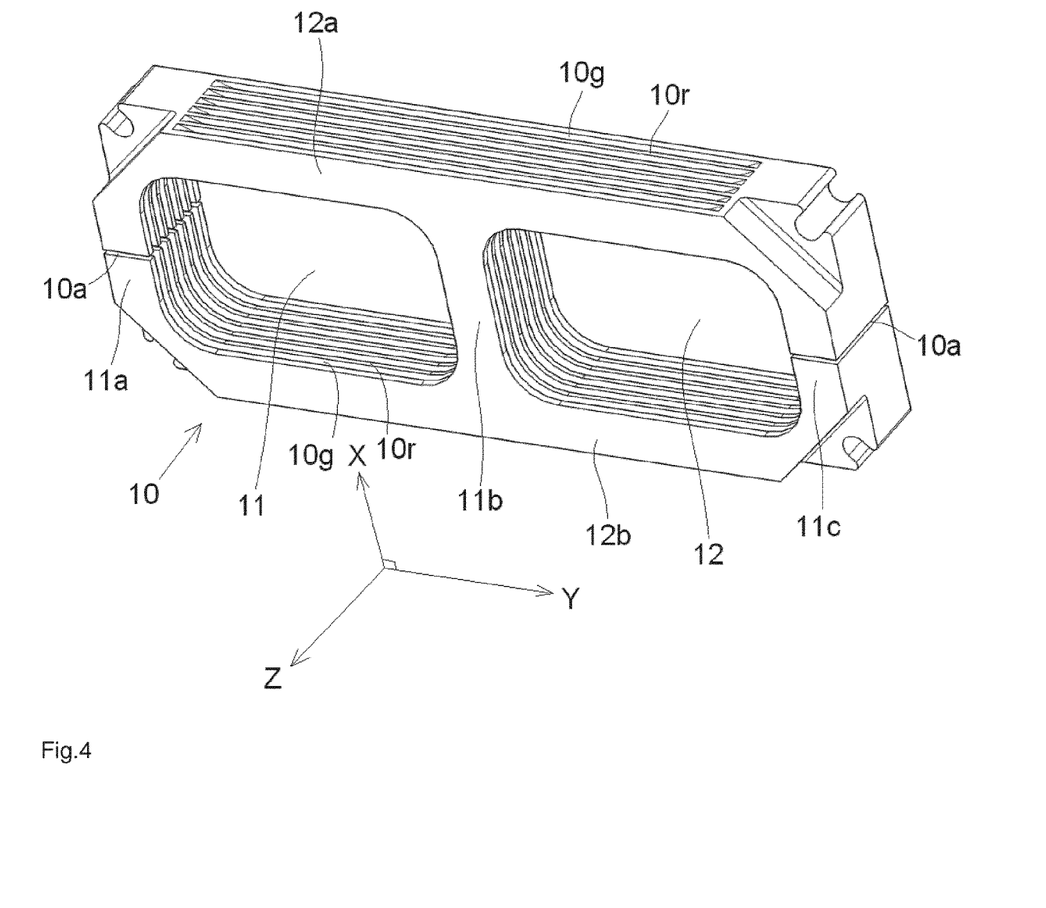
FIG. 4 shows an illustrative perspective view of the resonance damping element according to an embodiment of the present invention.

FIG. 2 shows the resonance damping element mounted on the metallic enclosure 20 of the power converter; FIG. 4 shows an illustrative perspective view of the resonance damping element according to an embodiment of the present invention.

As shown in FIG. 1-2 and 4, in an embodiment, the resonance damping element mainly comprises a magnetic core 10. The magnetic core 10 is formed with two openings 11, 12 through which the positive busbar 1 and the negative busbar 2 of the power converter are to be routed, respectively.

As shown in FIG. 4, the magnetic core 10 is configured to be a single solid block made of magnetic material. But the present invention is not limited to this embodiment, for example, in another embodiment, the magnetic core 10 may be made of two solid halves each including one opening.

Figure 13:
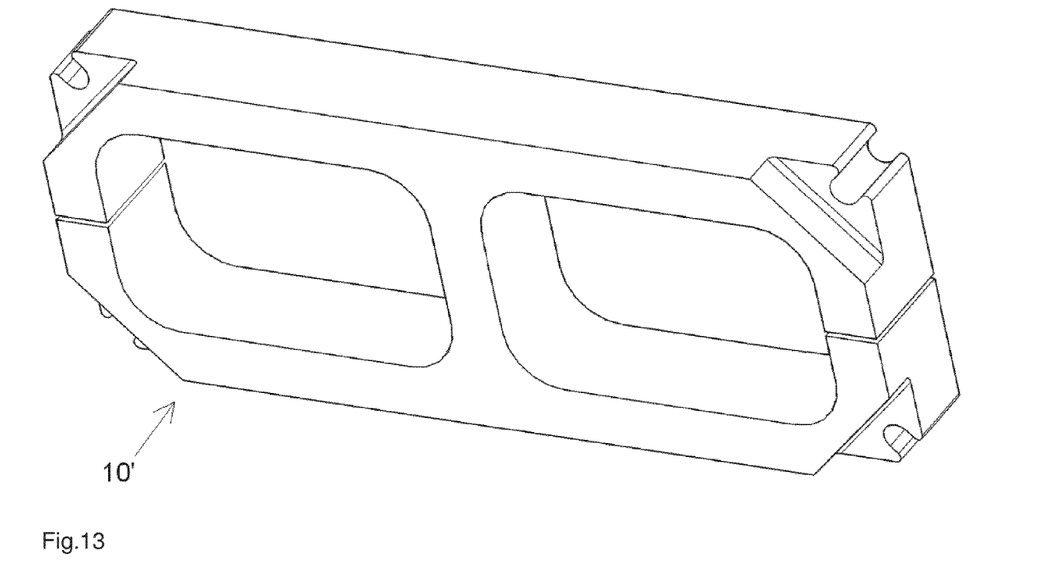
FIG. 13 is an illustrative perspective view of a resonance damping element according to another embodiment of the present invention.

In a preferred exemplary embodiment, the magnetic material comprises iron, structural steel or other iron based alloy. In this way, a rapidly declining inductance and high eddy current/hysteresis losses are achieved using a solid iron/steel core instead of laminated electrical steel. A solid core using for example bulk construction steel is also cheap and easy to manufacture. FIG. 4 shows a solid core 10 with grooves 10g, FIG. 13 shows a solid core 10' without grooves. Except for the grooves, the solid core 10' of FIG. 13 is basically same as the solid core 10 of FIG. 4.

As shown in FIG. 4, the resonance damping element (or referred to as a damper) consists of a magnetic core 10 having three legs 11a, 11b, 11c as illustrated in FIG. 4. The positive and negative busbars 1 and 2 of the power converter are routed through their own core openings 11 and 12.

As shown in FIG. 4, the magnetic core 10 comprises three legs 11a, 11b, 11c each extending in a first direction X perpendicular to the longitudinal direction Z of the busbars 1, 2 and two beams 12a, 12b each extending in a second direction Y perpendicular to the first direction X. One end of each leg 11a, 11b, 11c is connected to one of the two beams 12a, 12b, the other end of each leg 11a, 11b, 11c is connected to the other of the two beams 12a, 12b.

As shown in FIG. 4, the three legs 11a, 11b, 11c comprises a first leg 11a, a second leg 11b and a third leg 11c. The two openings 11, 12 comprises a first opening 11 defined between the first leg 11a and the second leg 11b, and a second opening 12 defined between the second leg 11b and the third leg 11c.

As shown in FIG. 4, the openings 11, 12 have a rectangular shape. But the present invention is not limited to this;

the openings 11, 12 may have any other suitable shape, for example, round shape or oval shape, and the shape of the legs/beams may vary accordingly.

Figure 5:
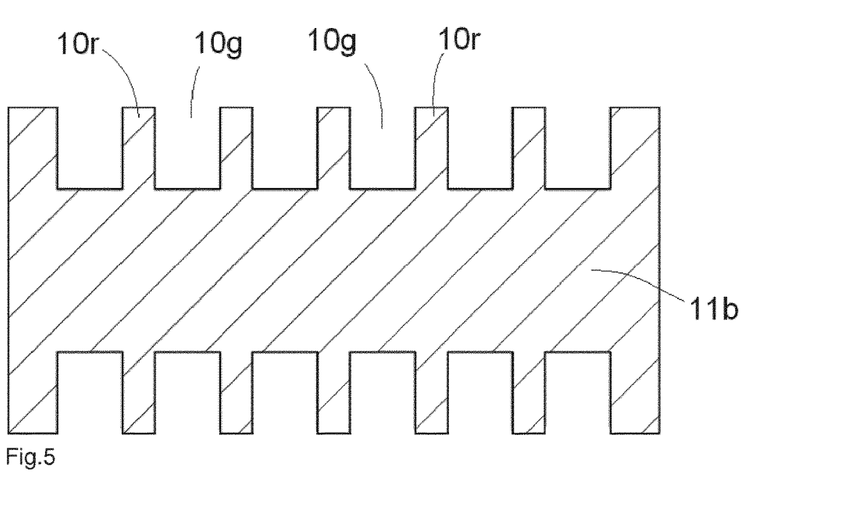
FIG. 5 shows an illustrative cross section view of a leg of a magnetic core of the resonance damping element shown in FIG. 4.

FIG. 5 shows an illustrative cross section view of the second leg 11b of the magnetic core 10 of the resonance damping element shown in FIG. 4.

As shown in FIGS. 4-5, the magnetic core 10 has inner surfaces that face the busbars 1, 2 and outer surfaces that are opposite to the busbars 1, 2, and a plurality of ridges 10r and grooves 10g are formed to extend along at least one of the inner surfaces and the outer surfaces of the magnetic core 10. In other words, the ridges 10r and grooves 10g extend in a plane perpendicular to the longitudinal direction Z of the busbars 1, 2, and the ridges 10r and grooves 10g are arranged alternately in the longitudinal direction Z of the busbars 1, 2.

The conductor has a nature of "skin effect", that is to say, current is usually concentrated in the skin layer of the conductor, and there is almost no current in the inner part of the conductor. Generally, the thickness of the skin layer, in which the current is concentrated, of the conductor is referred as a "skin depth". The skin depth may be calculated according to the following formula:

$$\Delta = \sqrt{\frac{2}{\omega \mu v}} \quad (1)$$

in which,
Δ indicates the skin depth;
ω=2 πf, in which f indicates the frequency of the current;
μ indicates the magnetic permeability of the conductor;
v indicates the conductivity of the conductor.

In the above embodiment shown in FIGS. 4-5, by forming the ridges 10r and grooves 10g in the surfaces of the magnetic core 10, it increases the whole surface area of the magnetic core 10, and it increases the effective length which the eddy currents need to travel. As a result, grooves 10g and ridges 10r added to the surfaces of the magnetic core 10 may further increase the damper AC resistance at high frequency.

Figure 6:
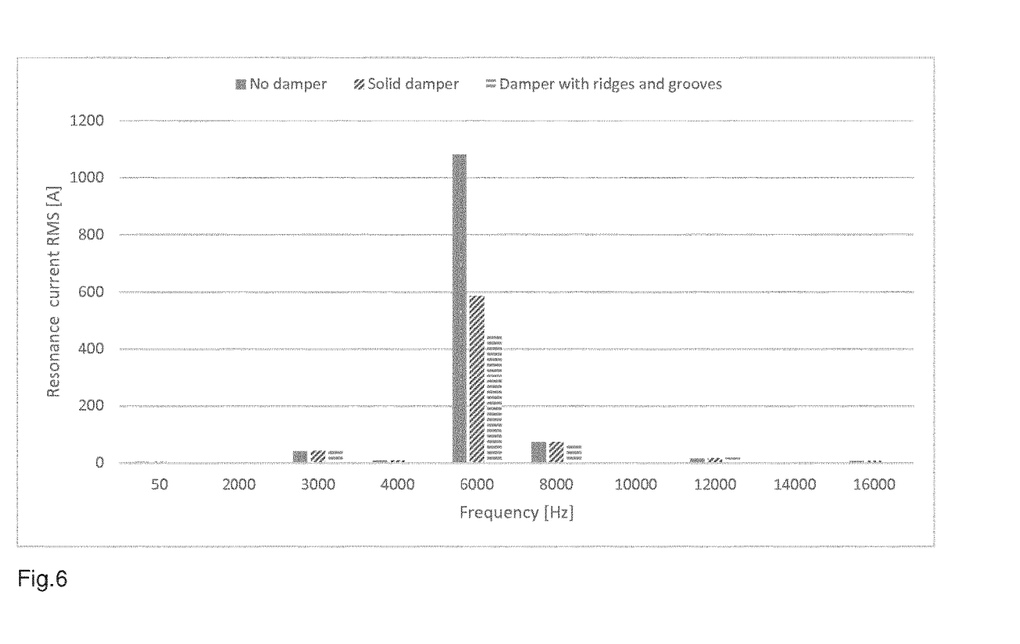
FIG. 6 shows an example of FFT of measured DC-link ripple current components with different damping configurations.

FIG. 6 shows an example of damper performance. In this example, INU $f_{sw}$=3 kHz, AFE $f_{sw}$=8 kHz, in which $f_{sw}$ indicates Switching Frequency. Resonance frequency with the installed busbars is around 6 kHz. The nominal DC-current on top of which the ripple current is imposed was 420 A.

No damper: DC-link ripple current RMS 1080 A
Steel S235 core without grooves and ridges (1 mm gap): 584 A; ripple reduction: 46%
Steel S235 core with grooves and ridges (1 mm gap): 445 A; ripple reduction 59%.

Figure 11:
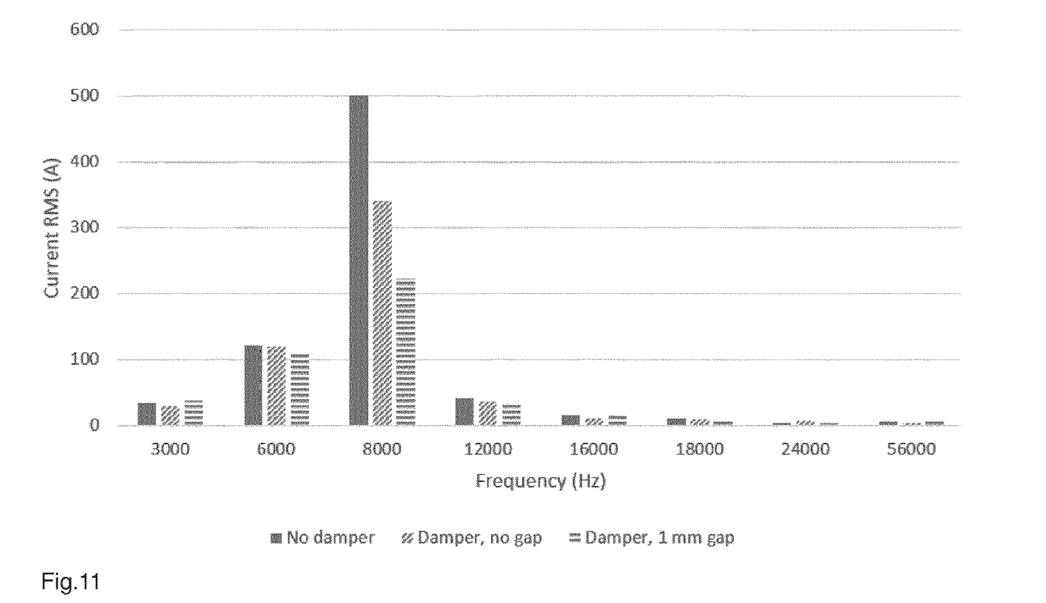
FIG. 11 shows FFT of measured DC-link ripple current components with different damping configurations.

As shown in FIG. 11, the grooves 10g and ridges 10r added to the surfaces of the magnetic core 10 further increase the damper AC resistance and further reduce the ripple current.

Figure 9:
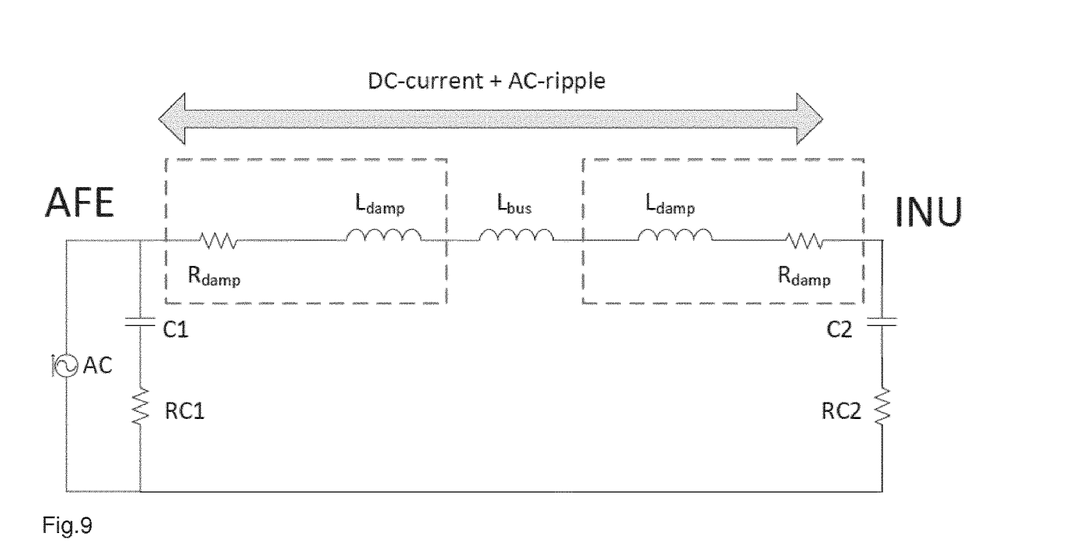
FIG. 9 shows an equivalent circuit of the resonance damping element involved in a DC-link resonance circuit.

In an embodiment, as shown in FIGS. 4-5, a dimension of each ridge 10r in the longitudinal direction Z of the busbars 1, 2 is sufficiently larger than the skin depth of the magnetic core 10, so that the flux cannot pass directly through, but needs to travel along the groove surface. In this way, it increases the length which eddy currents have to travel and therefore increasing losses by making grooves into legs and beams. FIG. 9 shows an equivalent circuit of the resonance damping element 10 involved in a DC-link resonance circuit.

As shown in FIG. 9, which shows an equivalent circuit of a frequency converter (or motor drive). The frequency converter has two different power converters, an Active Front End (AFE) that converts AC to DC and an Inverter Unit (INU) that converts DC to AC. AFE and INU include DC-link capacitors C1 and C2 respectively. $L_{bus}$ is the inductance of the busbars 1, 2 connecting AFE and INU. Each of AFE and INU has a damper (resonance damping element 10) which consists of frequency dependent resistance $R_{damp}$ and inductance $L_{damp}$.

The purpose of the damper circuit is to introduce additional resistance to the circuit without adding too much inductance. The damper should provide low resistance to low frequencies, but as high resistance as possible for switching frequencies (>1 kHz). The low inductance is desired, since it is not beneficial to lower the circuit resonance frequency close to switching frequencies and their multiplies.

Figure 10A:
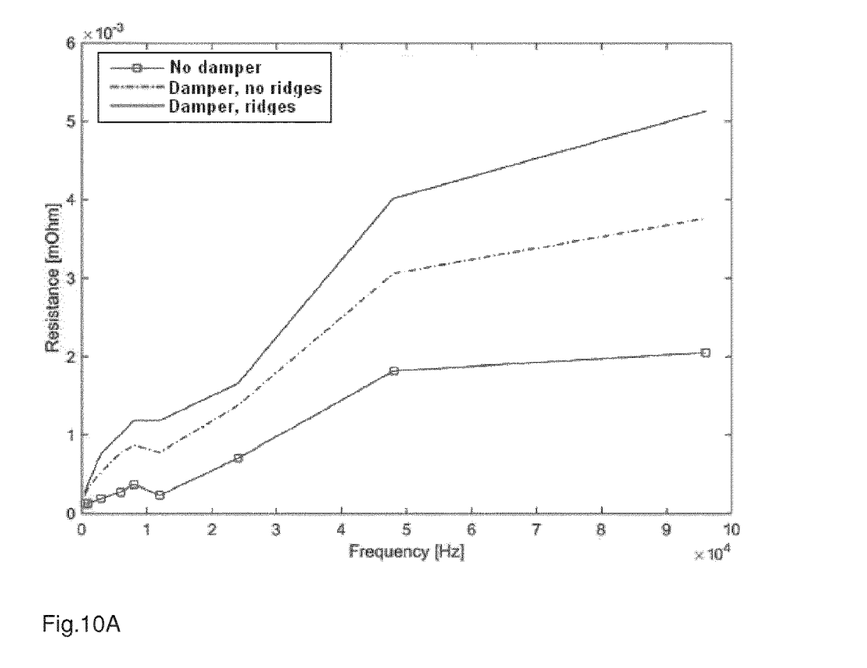
FIG. 10A shows resistance-frequency curves in different situations when no damper, damper without ridges and damper with ridges are used, respectively.

FIG. 10A shows resistance-frequency curves in different situations when no damper, damper without ridges and damper with ridges are used, respectively.

In FIG. 10A, measurements are from a non-laminated damper core. The small signal measurement somewhat underestimates the effects dependent on the DC-operating point and the flux swing. As shown in FIG. 10A, when the circuit resonance frequency is less than the switching frequency (>1 kHz), the damper provides low resistance; when the circuit resonance frequency becomes higher than the switching frequency (>1 kHz), the damper may provide high resistance.

Also, as shown in FIG. 10A, the DC-link resonance circuit with the damper having the grooves and ridges shown in FIGS. 4-5 has the highest resistance at high frequency.

Figure 10B:
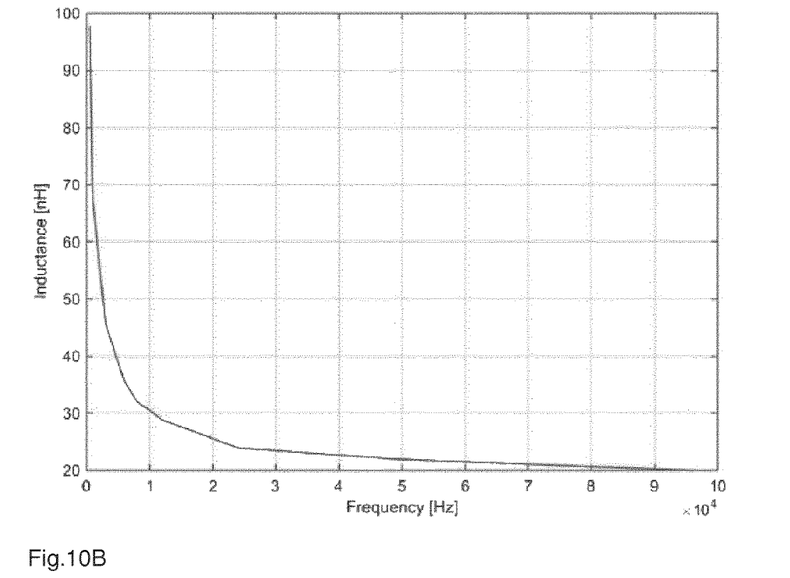
FIG. 10B shows an inductance-frequency curve for a resonance damping element having a solid core without ridges and grooves.

FIG. 10B shows an inductance-frequency curve for a resonance damping element having a solid core 10' (see FIG. 13) without ridges and grooves.

As shown in FIG. 10B, the inductance of the resonance damping element is rapidly decreased with the increase of the frequency. Thereby, the inductance of the resonance damping element at high frequency becomes very small. That is, the inductance of the resonance damping element is minimized at high frequency.

In an embodiment, the magnetic core 10 may or may not have air gap(s) in either the legs 11a, 11b, 11c or the beams 12a, 12b. In the illustrated embodiment shown in FIG. 4, the legs 11a, 11c are formed with air an gap 10a, and the leg 11b and the beams 12a, 12b are not formed with air gaps. In this embodiment, the air gaps 10a are used to position the BH-curve operating point in the center of the linear region, when operating under a DC-bias.

The operating principle of the damper is such that the DC current flowing in the DC-link generates a constant DC-flux to the magnetic material. The magnitude of this flux can be controlled with air gaps. Any high frequency deviation (current peak) from this DC current generates a minor hysteresis loop and eddy currents and therefore also hysteresis and eddy current losses, respectively. The higher the AC excitation, the larger the losses. The losses generated by the damper are effectively transferred into a cooling liquid flowing through the power converter cooling circuit (will described later) through the thermally conductive enclosure 20.

FIG. 11 shows an example of damper performance. In this example, it presents a measurement result with an AFE-INU pair. There was a severe DC-link resonance at AFE switching frequency of 8 kHz and the damper circuit provided up to 51% reduction to this resonance current. The damper with air gaps performs better due to more linear operation (not saturated due to DC-current) and additional fringing flux induced eddy current losses around air gaps. The damper was machined from solid S235 steel bar having a thickness of 20 mm.

In the example of FIG. 11, it shows FFT of measured DC-link ripple current components with different damping configurations. INU $f_{sw}$=3 kHz, AFE $f_{sw}$=8 kHz, in which $f_{sw}$ indicates Switching Frequency. Resonance frequency with the installed busbars is around 8 kHz. The nominal DC-current on top of which the ripple current is imposed was 420 A.

No damper: DC-link ripple current RMS 553 A

Steel S235 core without gap: 351 A; ripple reduction: 36.5%

Steel S235 core with 1 mm air gap: 269 A; ripple reduction 51%

The lower AC current content combined to the nominal DC current enables a lower DC fuse rating and improves DC-link capacitor lifetime via reduced temperatures.

In the embodiment shown in FIG. 11, the magnetic core 10 is configured to be a solid block made of magnetic material. The solid block material could be iron, structural steel or other iron based alloy. Aim is to get high permeability ($\mu_r$=thousands) and rather low resistivity (preferably $\rho<5*10^{-7}$ ohm/m).

Figure 3:
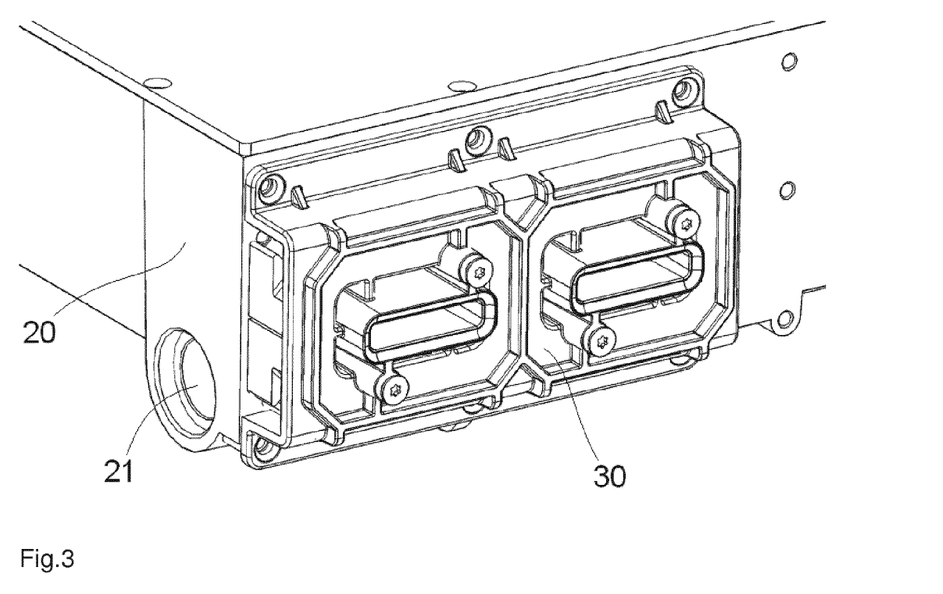
FIG. 3 shows an insulating cover mounted on the metallic enclosure of the power converter to cover the resonance damping element and insulate the busbars from the metallic enclosure openings.

As shown in FIG. 1, the power converter further includes a cooling means adapted to cool the metallic enclosure 20. In an embodiment, as shown in FIGS. 1-3, the cooling means comprises a liquid cooling channel 21 integral with the metallic enclosure 20 through which cooling liquid flows. In an embodiment, there may be provided a plug at the end of the channel, which is removed for clarity.

Please be noted that the cooling means adapted to cool the resonance damping element is not limited to the embodiment shown in FIG. 1. In another embodiment, the cooling means may comprise either a fan or a heatsink.

In the embodiment shown in FIG. 1, the resonance damping element is thermally connected to the metallic enclosure 20 and the cooling means cools the resonance damping element by cooling the metallic enclosure 20. But the present invention is not limited to this, for example, the resonance damping element may be installed to a separate heat conductor integrated with a liquid cooling channel.

In this way, as shown in FIGS. 1-3, the heat generated by the resonance damping element may be quickly transferred into the cooling liquid flowing through the liquid cooling channel 21.

Please be noted that, in the present invention, the cooling means is not limited to the embodiments shown in FIGS. 1-3. For example, the cooling means may be a heat radiation sink directly mounted on the metallic enclosure 20 of the power converter or a heat exchanger with a cooling passage communicated with the liquid cooling channel 21 of the metallic enclosure 20.

As shown in FIG. 2, the magnetic core 10 may be screwed to the metallic enclosure 20 and physically contacts the metallic enclosure 20. In this way, the magnetic core 10 may directly abut against an outer surface of the metallic enclosure 20. But the present invention is not limited to this, for example, the damper may or may not be electrically insulated from the metallic enclosure 20, while maintaining low thermal resistance.

As shown in FIG. 1, the positive busbar 1 and the negative busbar 2 respectively have a positive output terminal 1a and a negative output terminal 2a provided on a side of the magnetic core that is opposite to the metallic enclosure.

As shown in FIGS. 1-3, in an exemplary embodiment, the power converter may further comprise an insulating cover 30, for example, a plastic cover, mounted on the metallic enclosure 20, so as to cover the magnetic core 10 and insulate the positive and negative busbars 1, 2 from the enclosure openings, through which the busbars extends out of the enclosure 20, by positioning cylinders 31, 32 (see FIG. 8) of the plastic cover.

Figure 7:
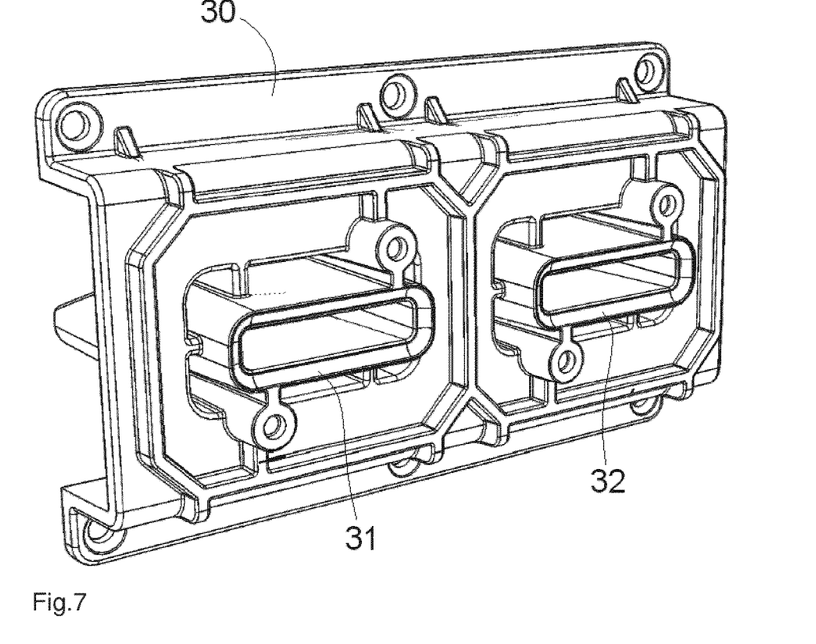
FIG. 7 is an illustrative perspective view of the insulating cover of FIG. 3 viewed from the front side.
Figure 8:
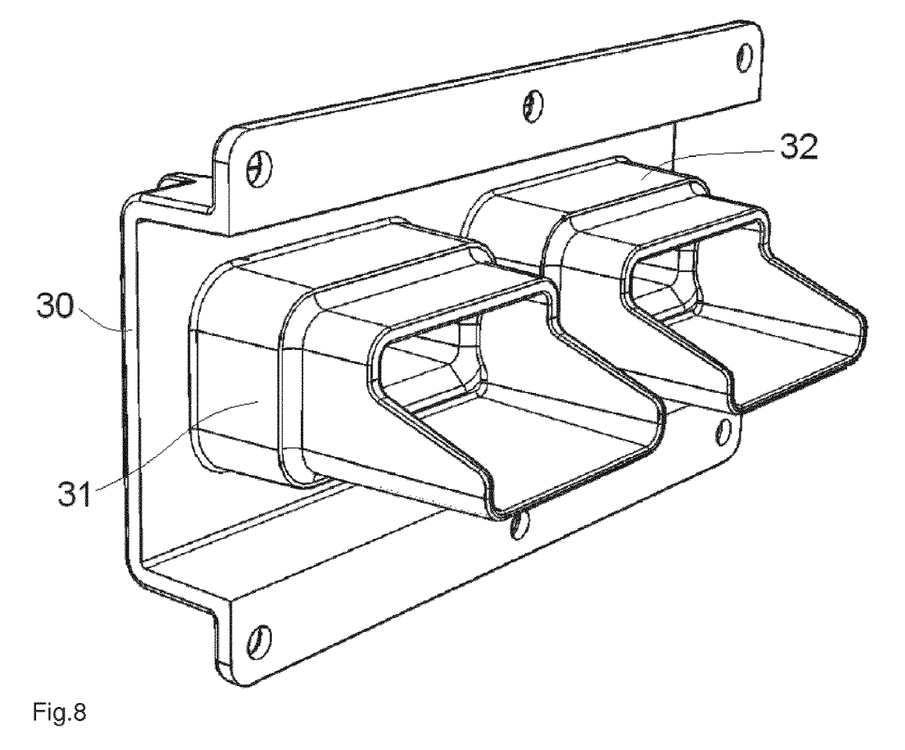
FIG. 8 is an illustrative perspective view of the insulating cover of FIG. 3 viewed from the back side.

FIG. 7 is an illustrative perspective view of the insulating cover 30 when viewed from the front side; FIG. 8 is an illustrative perspective view of the insulating cover 30 when viewed from the back side.

As shown in FIGS. 7-8, the insulating cover 30 comprises a cover plate and a pair of positioning cylinders 31, 32 formed on the cover plate and protruding from both sides of the cover plate. As shown in FIG. 1, after the insulating cover 30 is mounted on the metal enclosure 20 of the power converter, the positive and negative busbars 1, 2 are passed through and positioned in the pair of positioning cylinders 31, 32, respectively.

Please be noted that the resonance damping element is not limited to the embodiment shown in FIG. 4. The resonance damping element shown in FIG. 4 may be modified or changed. For example, FIG. 12 is an illustrative perspective view of a resonance damping element according to another embodiment of the present invention.

Figure 12:
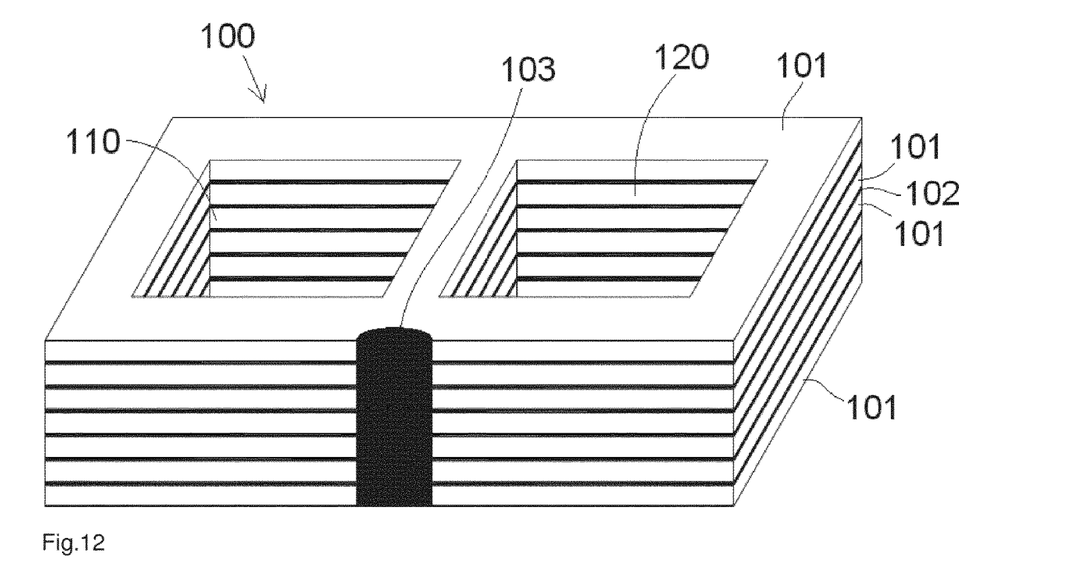
FIG. 12 is an illustrative perspective view of a resonance damping element according to another embodiment of the present invention.

As shown in FIG. 12, the magnetic core 100 of the resonance damping element is formed of laminated magnetic material sheets 101 with insulated laminations 102. In a preferred exemplary embodiment, the laminated magnetic material sheets 101 may comprise laminated magnetic silicon steel sheets.

As shown in FIG. 12, in an embodiment, the insulated lamination 102 may be an insulation layer separate from the magnetic material sheet 101 or a coating layer on the magnetic material sheet 101.

As shown in FIG. 12, in an embodiment, all laminated magnetic material sheets 101 of the magnetic core 100 are weld together by a weld beam 103 running through the magnetic core in the longitudinal direction of the busbars.

As shown in FIG. 12, the magnetic material sheets 101 and the insulated laminations 102 are alternately stacked in the longitudinal direction Z of the busbars 1, 2.

In the embodiment shown in FIG. 12, the magnetic core 100 is formed with two openings 110, 120 through which the positive busbar 1 and the negative busbar 2 of the power converter are to be routed, respectively.

Although it is not shown, in an embodiment, the magnetic core 100 may be configured to have air gaps in the sidewalls of the two openings 110, 120.

In the embodiment shown in FIG. 12, the laminated magnetic core 100 may increase hysteresis loss of the damper.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A resonance damping element for a power converter having a positive busbar and a negative busbar, wherein the resonance damping element comprising:
    a magnetic core formed with two openings through which the positive busbar and the negative busbar of the power converter are to be routed, respectively, and
    wherein the magnetic core has inner surfaces that face the busbars and outer surfaces that are opposite to the busbars, and a plurality of ridges and grooves are formed to extend along at least one of the inner surfaces and the outer surfaces of the magnetic core, and the ridges and grooves are arranged alternately in the longitudinal direction of the busbars,
    wherein in the longitudinal direction of the busbars, each ridge has a dimension that is larger than a skin depth of the magnetic core when a resonance frequency of the current is around 6000 hz.

2. The resonance damping element according to claim 1, wherein the magnetic core is formed of laminated magnetic material sheets with insulated laminations;
    wherein the insulated lamination is an insulation layer separate from the magnetic material sheet or a coating layer on the magnetic material sheet.

3. The resonance damping element according to claim 2, wherein the laminated magnetic material sheets are welded together by a weld beam running through the magnetic core in the longitudinal direction of the busbars.

4. The resonance damping element according to claim 3, wherein the laminated magnetic material sheets comprise laminated magnetic silicon steel sheets.

5. The resonance damping element according to claim 2, wherein the laminated magnetic material sheets comprise laminated magnetic silicon steel sheets.

6. The resonance damping element according to claim 1, wherein the magnetic core comprises a solid block made of magnetic material.

7. The resonance damping element according to claim 6, wherein the magnetic material comprises iron, structural steel or other iron based alloy.

8. The resonance damping element according to claim 1, wherein the magnetic core comprises:
    three legs each extending in a first direction; and
    two beams each extending in a second direction perpendicular to the first direction,
    wherein each leg has one end connected to one beam and another end connected to the other beam.

9. The resonance damping element according to claim 8, wherein the magnetic core is configured to have an air gap in at least one of the legs or the beams.

10. The resonance damping element according to claim 1, wherein the openings are rectangular, round or oval.

11. A power converter comprising:
    a metallic enclosure;
    a resonance damping element comprising a magnetic core formed with two openings; and
    a positive busbar and a negative busbar extending through the two openings of the magnetic core, respectively,
    wherein an inductance of the resonance damping element is decreased with an increase of a frequency,
    wherein the magnetic core has inner surfaces that face the busbars and outer surfaces that are opposite to the busbars, and a plurality of ridges and grooves are formed to extend along at least one of the inner surfaces and the outer surfaces of the magnetic core, and the ridges and grooves are arranged alternately in the longitudinal direction of the busbars,
    wherein in the longitudinal direction of the busbars, each ridge has a dimension that is larger than a skin depth of the magnetic core when a resonance frequency of the current is around 6000 hz.

12. The power converter according to claim 11, further comprising a cooling means adapted to cool the resonance damping element.

13. The power converter according to claim 12, wherein the resonance damping element is thermally connected to the metallic enclosure and the cooling means cools the resonance damping element by cooling the metallic enclosure.

14. The power converter according to claim 12, wherein the cooling means comprises a liquid cooling channel integral with the metallic enclosure through which cooling liquid flows.

15. The power converter according to claim 12, wherein the cooling means comprises either a fan or a heatsink.

16. The power converter according to claim 11, wherein the magnetic core abuts against an outer surface of the metallic enclosure, and the positive busbar and the negative busbar respectively have a positive output terminal and a negative output terminal provided on a side of the magnetic core that is opposite to the metallic enclosure.

17. The power converter according to claim 16, wherein the power converter further comprises an insulating cover mounted onto the metallic enclosure to cover the magnetic core and insulate the positive and negative busbars from the metallic enclosure openings through which the busbars extends out.

* * * * *